(12) United States Patent
Böhrer et al.

(10) Patent No.: US 8,931,603 B2
(45) Date of Patent: Jan. 13, 2015

(54) DAMPER

(75) Inventors: Andreas Böhrer, Neumarkt (DE);
Roland Löscher, Tennenlohe (DE);
Andreas Krog, Winkelhaid (DE)

(73) Assignee: SUSPA GmbH, Altdorf (DE)

( * ) Notice: Subject to any disclaimer, the term of this patent is extended or adjusted under 35 U.S.C. 154(b) by 128 days.

(21) Appl. No.: 13/585,313

(22) Filed: Aug. 14, 2012

(65) Prior Publication Data

US 2013/0206524 A1 Aug. 15, 2013

(30) Foreign Application Priority Data

Aug. 15, 2011 (DE) .......................... 10 2011 080 962

(51) Int. Cl.
*F16F 9/19* (2006.01)
*F16F 9/36* (2006.01)
*F16F 9/06* (2006.01)

(52) U.S. Cl.
CPC ...... *F16F 9/19* (2013.01); *F16F 9/36* (2013.01);
*F16F 9/062* (2013.01)
USPC ........................ 188/317; 188/320; 188/322.22

(58) Field of Classification Search
CPC ................. F16F 9/34; F16F 9/36; F16F 9/44;
F16F 9/185; F16F 9/348; F16F 9/362; F16F 9/363; F16F 9/364; F16F 9/0218; F16F 9/3214; F16F 9/3242; F16F 9/3405; F16F 9/3485
USPC .......... 188/316, 317, 318, 319.1, 319.2, 320, 188/322.13, 322.17, 322.18; 267/64.11, 267/64.17, 119, 124
See application file for complete search history.

(56) References Cited

U.S. PATENT DOCUMENTS

| | | | | |
|---|---|---|---|---|
| 2,107,974 A | * | 2/1938 | Rene et al. | 188/318 |
| 2,155,978 A | * | 4/1939 | Von Oberstadt | 188/269 |
| 2,606,630 A | * | 8/1952 | Rossman | 188/284 |
| 2,803,313 A | * | 8/1957 | Ulmann | 188/282.9 |
| 4,364,457 A | * | 12/1982 | Wossner et al. | 188/322.17 |
| 4,428,566 A | * | 1/1984 | de Baan et al. | 267/64.15 |
| 2004/0251097 A1 | * | 12/2004 | Barbison et al. | 188/315 |

FOREIGN PATENT DOCUMENTS

| | | |
|---|---|---|
| DE | 1 678 886 U | 6/1954 |
| DE | 2 111 713 A | 9/1972 |

(Continued)

*Primary Examiner* — Anna Momper
*Assistant Examiner* — San Aung
(74) *Attorney, Agent, or Firm* — McGlew and Tuttle, P.C.

(57) ABSTRACT

A damper for damping a movement along a middle-longitudinal-axis, in particular for damping a seat in a vehicle, includes an outer housing extending along the middle-longitudinal-axis, a guiding and sealing unit closing a first housing end, a piston rod sealed by the guiding and sealing unit guided, an inner housing, which surrounds a working chamber, a damping fluid, a second housing end opposite the first housing end and a piston guided in the inner housing along the middle-longitudinal-axis and secured to the piston rod. The piston divides the working chamber into a first part-working chamber and a second part-working chamber. The piston includes at least one throughflow channel for connecting the chambers, an equalizing chamber arranged between the inner housing and the outer housing and a throttling channel integrated into the guiding and sealing unit. The throttling channel has a cross-sectional area comprising a length and an internal width.

24 Claims, 5 Drawing Sheets

(56) References Cited

FOREIGN PATENT DOCUMENTS

| DE | 2 257 556 A | 5/1974 |
|---|---|---|
| DE | 295 06 891 U1 | 7/1995 |
| DE | 10 2004 029 452 A1 | 1/2006 |
| DE | 10 2008 042 251 B3 | 4/2010 |

\* cited by examiner

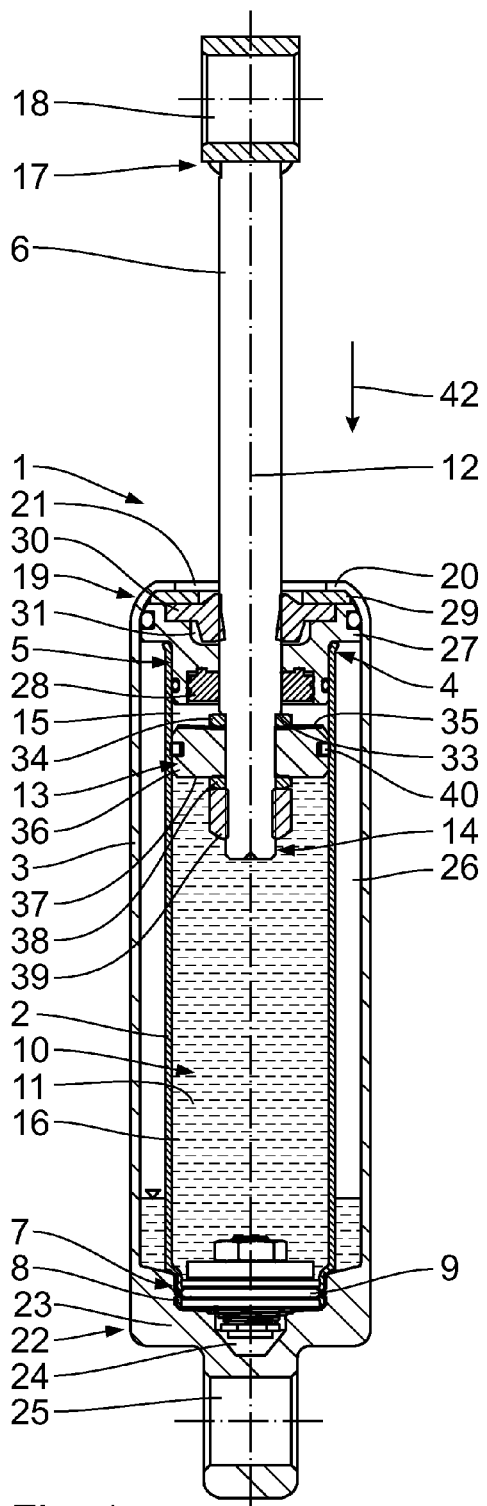
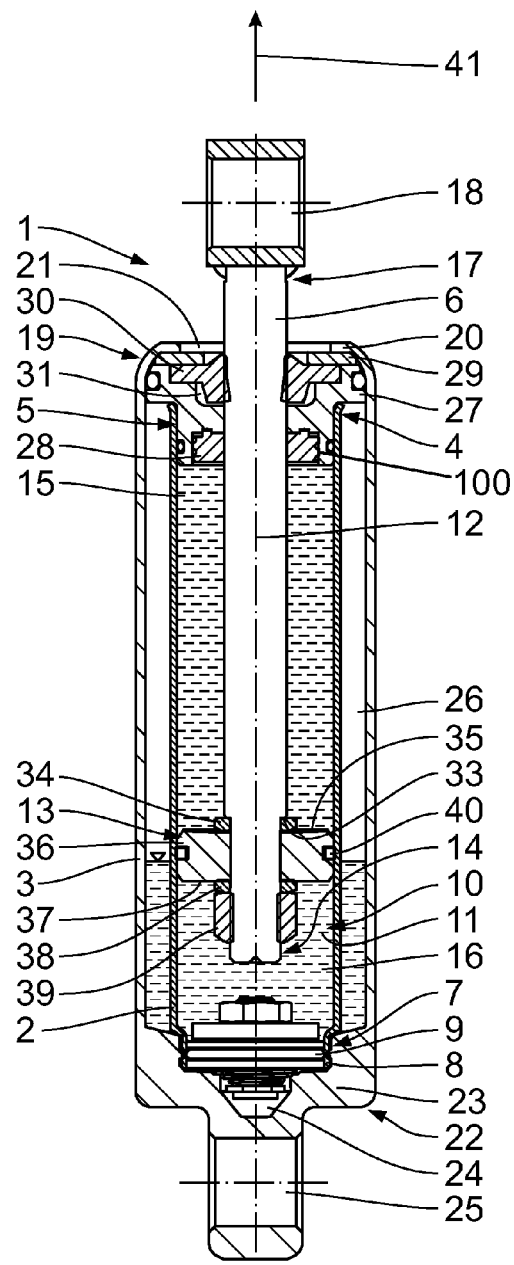
Fig. 1
Fig. 2

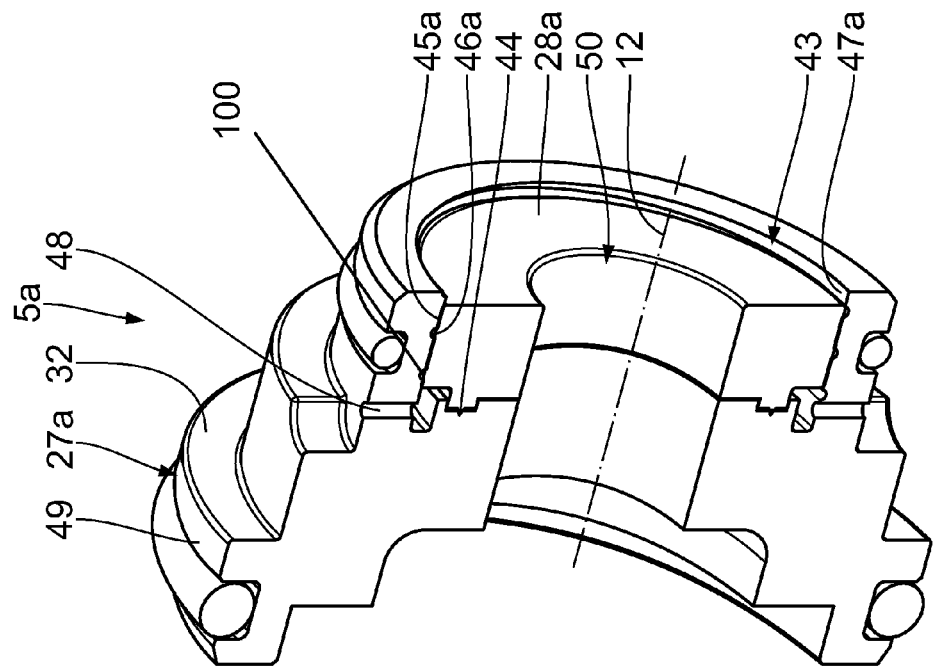
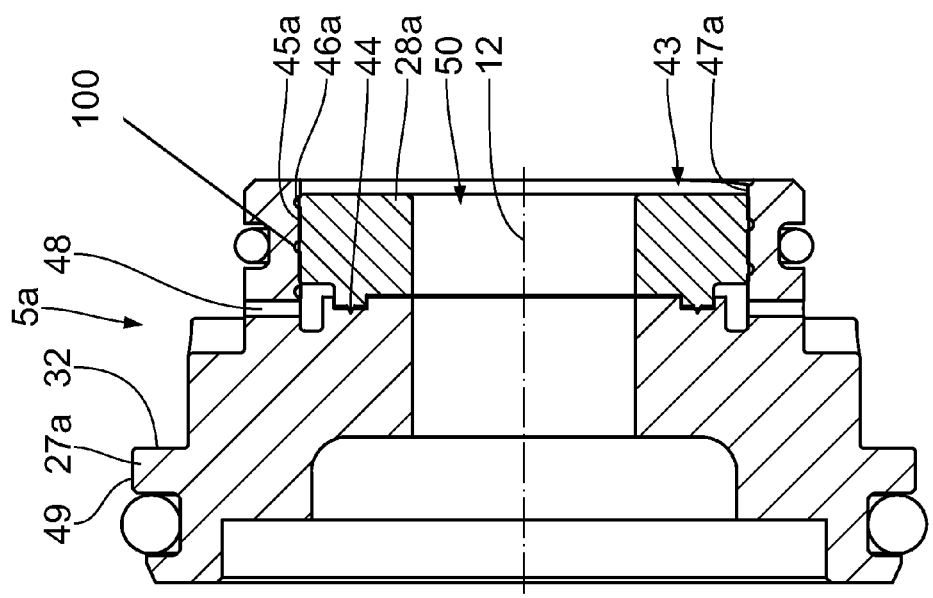

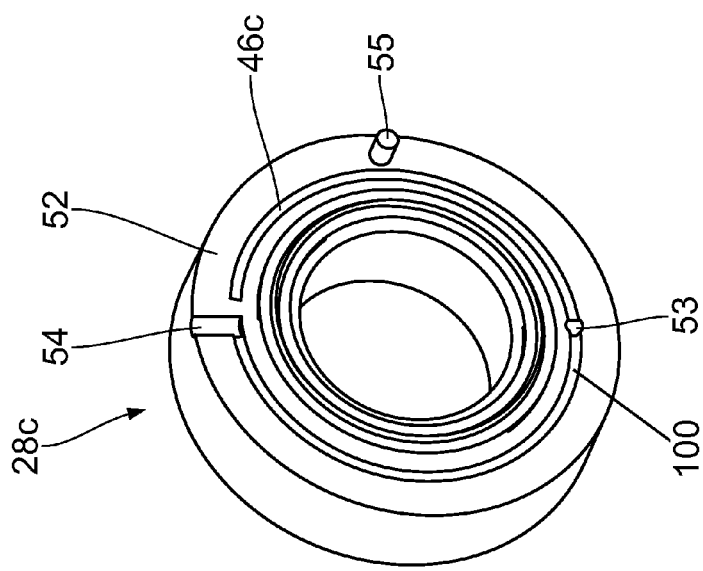
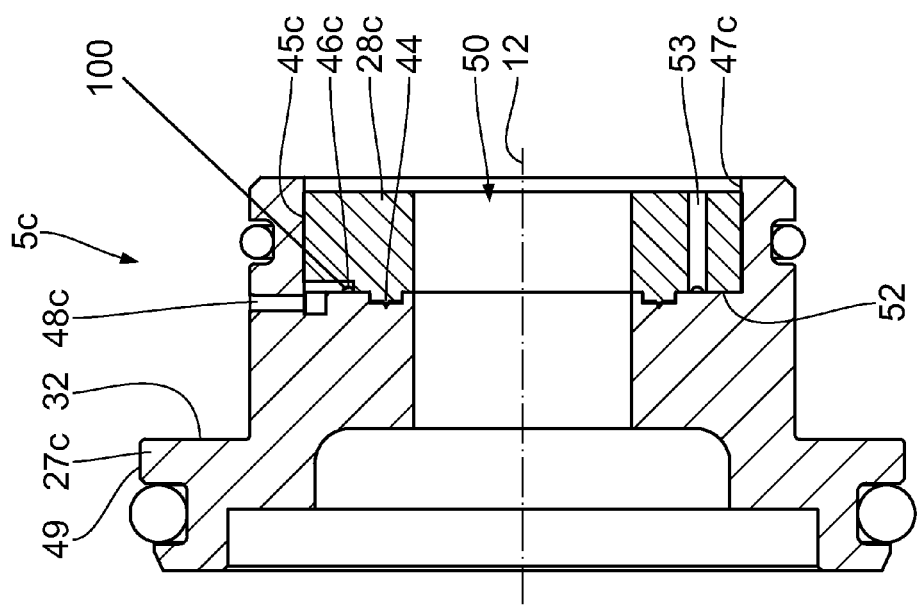
Fig. 10
Fig. 9

DAMPER

CROSS-REFERENCES TO RELATED APPLICATIONS

This application claims the priority of German Patent Application, Serial No. 10 2011 080 962.7, filed Aug. 15, 2011, pursuant to 35 U.S.C. 119(a)-(d), the content of which is incorporated herein by reference in its entirety as if fully set forth herein.

FIELD OF THE INVENTION

The application relates to a damper for damping a movement along a middle-longitudinal-axis, in particular for damping a seat in a vehicle.

BACKGROUND OF THE INVENTION

Dampers of this kind are known through prior use and are used for example for damping driver's seats in lorries or tractors. It is also possible in principle to use dampers of this kind as chassis dampers. In addition, it is possible to equip sports equipment and in particular rowing machines and the like with such dampers. Dampers of this kind are also known as twin-tube dampers. These kinds of dampers can vary in their damping behavior depending on the direction in which the damper is activated. For example a small damping effect may be desirable when the damper is activated in insertion direction, i.e. when a driver's seat is loaded. In comparison a large damping effect may be desirable in an extraction direction opposite the insertion direction, i.e. when the pressure is lifted from the driver's seat again. In twin-tube dampers when a piston rod is inserted pressure fluid, such as for example oil, is displaced from an inner working chamber and flows through a piston rod guide losing as little pressure as possible into an outer equalizing chamber. When the piston rod is drawn out the oil flow in the piston rod guide is opposed by a resistance, in order to achieve the increased damping effect. From prior use a valve arranged in the piston rod guide is known which opens with the piston rod pushed in and allows oil to flow through the piston rod guide with no resistance. Upon extraction the piston rod guide is sealed hermetically by the valve. If the valve is not functioning correctly the oil flow can be prevented when the piston rod is pushed in so that a surprisingly high damping effect is achieved. This is perceived for example as blocking the damper. It is also known from known prior use to use an annular gap provided between the piston rod and the piston rod guide as a flow passage for the pressure fluid. The size of the annular gap and thereby the damping effect of the damper overall are directly dependent on the manufacturing tolerances of the piston rod and the piston rod guide. Even small variations in the dimensions can significantly change the damping effect.

SUMMARY OF THE INVENTION

An objective of the present invention is to provide a damper with improved damping behavior, which functions perfectly and can be produced with little expense.

Said objective is achieved in a non-obvious manner by a damper for damping a movement along a middle-longitudinal-axis, in particular for damping a seat in a vehicle, comprising an outer housing extending along the middle-longitudinal-axis, a guiding and sealing unit closing the outer housing at a first housing end, a piston rod guided out of the first housing end sealed by the guiding and sealing unit, an inner housing arranged in the outer housing, which surrounds a working chamber, a damping fluid located in the working chamber, a second housing end opposite the first housing end, a piston guided in the inner housing along the middle-longitudinal-axis and secured to the piston rod, wherein the piston divides the working chamber into a first part-working chamber facing the first housing end and a second part-working chamber facing the second housing end, and wherein the piston comprises at least one throughflow channel for connecting the part-working chambers, an equalizing chamber arranged between the inner housing and the outer housing and a throttling channel integrated into the guiding and sealing unit for a fluid throttling connection between the working chamber and the equalizing chamber, wherein the throttling channel has a length and a cross-sectional area comprising an internal width. The crux of the invention is that the damping fluid, which is displaced during the activation of the damper from a working chamber into an equalizing chamber, passes through a throttling channel which represents a fluid throttling connection. The damping fluid flows through the throttling channel in particular both upon activation in a pushing in direction and also in a pulling out direction from the working chamber into the equalizing chamber. The throttling channel is integrated into a guiding and sealing unit of the damper, which closes an outer housing at a first housing end. By means of the guiding and sealing unit a piston rod at the first housing end is guided out of the damper in a sealed manner. In the outer housing an inner housing surrounding the working chamber is arranged. The inner housing has a middle-longitudinal-axis. The working chamber is divided by a piston secured to the piston rod into a first part-working chamber facing the first housing end and a second part-working chamber facing the second housing end. The piston comprises at least one throughflow channel for connecting the part-working chambers. The equalizing chamber is arranged between the inner housing and the outer housing. The throttling channel has a cross-sectional area oriented perpendicular to a fluid flow direction with an internal width and length and enables a throttled fluid connection between the working chamber and the equalizing chamber. A throttling effect or damping effect of the damper can be achieved in particular by varying the length of the throttling channel. In particular, the manufacturing precision of the production of the throttling channel has no significant influence on the damping effect. It is not necessary to use an annular gap arranged between the piston rod and the guiding and sealing unit as a throttling channel. The present damper makes it possible to influence the damping force as a function of the actuating direction, i.e. an extraction direction of the piston rod out of the damper or an insertion direction into the damper opposite the extraction direction, wherein in the insertion direction there is a small damping effect and in the extraction direction there is a large damping effect. The throttling channel can be produced in an uncomplicated and inexpensive manner. The throttling channel is robust in application, wherein in particular the blocking of the damper is avoided by closing the throttling channel during the application. Any malfunctioning of the damper is excluded.

A damper, in which the throttling channel is oriented at least in sections at right angles to the middle-longitudinal-axis and is configured in particular to be helical, meandering and/or spiral-shaped about the middle-longitudinal-axis, allows for a plurality of different embodiments of the throttling channel. Such a throttling channel can be integrated directly into the guiding and damping unit. It is possible to produce a long throttling channel with a comparatively small structural height of the guiding and damping unit. The damper is designed to be compact. A damper of this kind has a high ratio of damping effect to structural size. Such a damper is robust.

A damper, in which the ratio of the internal width to the length is less than 0.1, in particular less than 0.05, in particular less than 0.01 and in particular less than 0.005, enables a particularly effective damping of the damping fluid. The damping fluid is throttled along the throttling channel by means of a reduced internal width of the throttling channel and an increased length of the throttling channel. The larger the length of the throttling channel, the larger is the damping effect of the damping fluid along the throttle channel. The internal width of the throttling channel is smaller than its length, where the ratio of the internal width to the length is less than 0.1, in particular less than 0.05, in particular less than 0.01 and in particular less than 0.005. In particular, the cross-sectional area of the throttling channel has a circular shape, a semi-circular shape, a rectangular shape or any other geometric shape.

A damper, in which the length of the throttling channel is adjustable variably, can be adapted accordingly to the required purpose and in particular can be customized. It is possible for example that the damping effect may need to differ in the driver's seat of a lorry from the driver's seat of a tractor. It is not necessary to provide different dampers, but the damping effect of the dampers can be changed by changing the length of the throttling channel. This can be achieved in particular by varying the individual components of the guiding and sealing unit.

In the damper, in which the guiding and sealing unit comprises a guiding housing and a guiding cover, the guiding and sealing unit can be produced and assembled in an uncomplicated and inexpensive manner.

In the damper, in which the throttling channel is integrated into the guiding housing and/or the guiding cover, the throttling channel is designed to be robust. Owing to its integration into the guiding housing and/or the guiding cover it is not necessary to design the throttling channel as a separate, additional component. The number of parts of the damper is reduced overall.

A damper, in which the throttling channel is configured as a groove on a cylinder casing surface of the guiding housing or in which the throttling channel is configured as a groove on an outer cylinder-casing surface and/or an end face surface of the guiding cover facing in particular the guiding housing, enables an integrated, robust throttling channel with a reliable throttling effect.

A damper, in which the guiding and sealing unit comprises a cover element, has a simple and uncomplicated structure. In particular a guiding cover is not necessary.

In a damper, in which the annular cover element is arranged between an outer casing surface of the guiding housing and an inner casing surface of the inner housing, a cover element is used between the guiding housing of the guiding and sealing unit and the inner housing on the one hand as a sealing element and on the other hand as an adjusting element for the length of the throttling channel and thereby for the damping effect of the damper.

A damper, in which at least one check valve in the throttling channel is arranged such that the flow of fluid is allowed along the throttling channel from the working chamber into the equalizing chamber and is prevented in particular from the equalizing chamber into the working chamber, makes it possible to increase the dependency of the damping effect on orientation.

By means of a damper, in which the guiding and sealing unit comprises a sealing element and a valve ring, it is prevented that the damping fluid, the damping fluid that has escaped through an annular gap formed between the guiding and sealing unit and the piston rod into a pressure chamber on activating the damper, impairs its functionality. A valve ring prevents the damping fluid, in particular on activating the piston rod in the extraction direction, from coming out of the working chamber into the pressure chamber. In particular, a flow of fluid through the annular gap can be tolerated. In particular, it is not necessary to ensure that the piston rod guide satisfies the highest sealing requirements.

A damper, in which the guiding and sealing unit comprises a venting opening for venting a pressure chamber delimited by the guiding and sealing unit, the sealing element, the valve ring and the piston rod, enables a controlled reduction of pressure in the pressure chamber by means of a vent opening. In this way it is ensured that damping fluid that has entered into the pressure chamber does not damage the sealing element of the guiding and sealing unit.

A damper comprising a minimum venting pressure for venting the pressure chamber via the venting opening, wherein the venting pressure is greater than a fluid pressure along the throttling channel, enables the pressure relief of the pressure chamber and thereby the sealing element, without the functionality of the throttling channel and thereby of the damper overall being impaired. Also a possible malfunction of the valve ring, i.e. closing of the annular gap, in particular during the activation of the piston rod in insertion direction, does not result in a worsening of the damping effect of the damper. A throttled outflow of the damping fluid via the throttling channel is ensured. A worsening of the potential seat damping cannot be felt by the driver. In addition, a possible malfunction of the valve ring so that the annular gap does not close, in particular when activating the piston rod in the removal direction, does not lead to a worsening of the damping effect of the damper. The influence of a vent opening of the pressure chamber is subordinate to the throttling section, i.e. the damping effect of the damper is provided exclusively by means of the throttling section. It is also possible to activate further flow cross sections by means of the valve ring, i.e. so that said additional flow cross sections are uncovered by means of the valve in order to reduce the fluid outflow via the throttling channel and thus the damping effect of the damper overall.

In a damper, in which the working chamber is connected at the second housing end by means of a bottom valve to the equalizing chamber, wherein the bottom valve enables in particular a flow of fluid from the equalizing chamber into the working chamber and in particular into the second part-working chamber, damping fluid can flow from the equalizing chamber via a bottom valve directly into the working chamber, i.e. into a second part-working chamber. In this way the damping effect is additionally disconnected from the activating direction. It is possible for example to configure at least one throughflow channel of the piston as a cylindrical bore, as the directional dependency of the fluid flow through the bottom valve activated in particular only in the removal direction of the piston rod is ensured.

Additional features and details of the invention are defined in the description of four exemplary embodiments with reference to the drawings.

BRIEF DESCRIPTION OF THE DRAWINGS

FIG. 1 shows a longitudinal cross section of a damper according to the invention according to a first exemplary embodiment with an essentially completely extracted piston rod, FIG. 2 shows a view according to FIG. 1 with an almost completely inserted piston rod, FIG. 5 shows a view according to FIG. 3 of a guiding and sealing unit according to a second exemplary embodiment, FIG. 6 shows a cross-sectional, perspective view according to FIG. 4 of a guiding and sealing unit according to the second exemplary embodiment, FIG. 9 shows a view according to FIG. 3 of a guiding and sealing unit according to a fourth exemplary embodiment and FIG. 10 shows a perspective view from the front of a guiding cover of the guiding and sealing unit according to FIG. 9.

DESCRIPTION OF THE PREFERRED EMBODIMENTS

Figure 4:
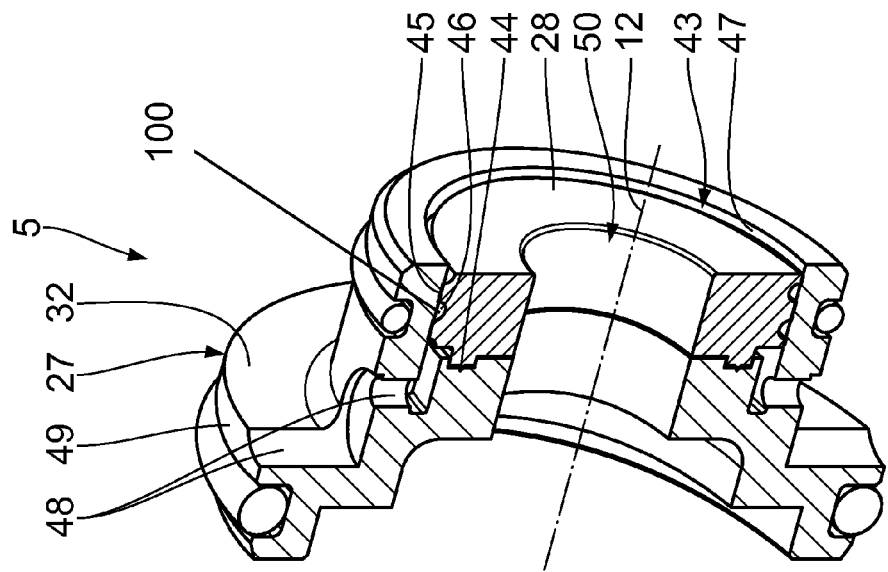
FIG. 4 shows a cross-sectional perspective view of the guiding and sealing unit according to FIG. 3.
Figure 3:
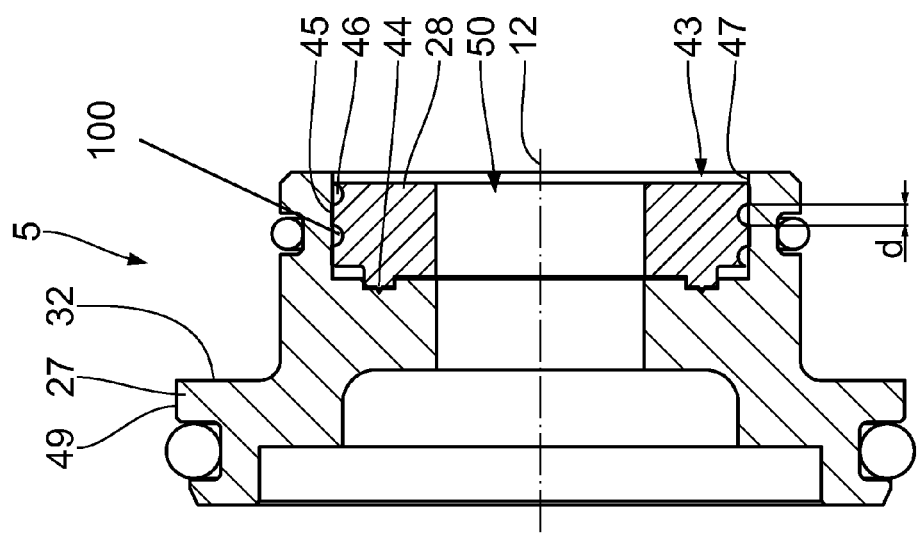
FIG. 3 shows an enlarged detailed view of a guiding and sealing unit of the damper in FIG. 1.

In the following with reference to FIGS. 1 to 4 a first exemplary embodiment of the invention is described. A damper denoted as a whole by the number 1 is in the form hydraulic damper and comprises a substantially hollow-cylindrical inner housing 2 and an outer housing 3 surrounding the inner housing 2. The two housings 2, 3 are configured according to the shown exemplary embodiment as tube sections. The damper 1 is referred to as a twin-tube damper.

The inner housing 2 is closed at a first housing end 4 shown in FIG. 1 on the left by a guiding and sealing unit 5 for guiding and sealing a piston rod 6 guided out of the first housing end 4. At a second housing end 7 opposite the first housing end 4 the inner housing 2 is closed by an annular housing cover 8 with a bottom valve 9. The inner-housing 2, the guiding and sealing unit 5 and the housing cover 8 essentially enclose a working chamber 10, which is filled with damping fluid 11. In the inner housing 2 concentrically to a middle-longitudinal-axis 12 a piston 13 guided displaceably along the latter is arranged which is secured to a first piston rod end 14. The piston 13 divides the working chamber 10 into a first part-working chamber 15 facing the first housing end 4 and a second part-working chamber 16 facing the second housing end 7. On a second piston rod end 17 arranged outside the damper 1 a first securing element 18 is formed in the shape of a cylindrical through opening.

The outer housing 3 has a round cross section and surrounds the inner housing 2. A first housing end 19 is flanged to form a housing stop 20, wherein a housing opening 21 is delimited through which the piston rod 6 is guided. A second housing end 22 of the outer housing 3 lying opposite the first housing end 19 is closed by a housing base 23 formed in one piece with the outer housing 3. The housing base 23 can also be joined as a separate and in particular multiple-part component to the outer housing 3. The housing base 23 is provided with a step-like housing base depression 24 for example on the side facing the inner housing 2 for mounting the base valve 9. On a side of the housing base 23 facing away from the inner housing 2 a second securing element 25 is formed or secured, wherein the second securing element 25 is aligned essentially centrally in relation to the middle-longitudinal-axis 12. The inner housing 2 and the outer housing 3 are arranged to be concentric to the middle-longitudinal-axis 12, so that an equalizing chamber 26 is formed in the form of an annular gap. The equalizing chamber 26 has a constant width around its circumference. It is also possible that the damper 1 comprises at least one housing 3 with a noncircular, essentially oval cross section, which is arranged to be offset relative to the other housing 2 such that the equalizing chamber 26 is formed in the form of an annular gap with an oval cross section. The equalizing chamber 26 can extend in addition into the housing base depression 24. The equalizing chamber 26 can be under pressure and is partly filled with damping fluid 11, for example oil or gas, such as for example nitrogen.

To attach the inner housing 2 in the outer housing 3 in the region of the first housing ends 4, 19 the guiding and sealing unit 5 comprises a guiding housing 27 and a guiding cover 28. The guiding cover 28 is arranged in a recess of the guiding housing 27 provided therefor. The guiding housing 27 is designed to be step-like along the middle-longitudinal-axis 12 and is sealed with an inner housing step in the inner housing 2. By means of an outer housing step the guiding housing 27 is sealed on the peripheral side on the outer housing 3 and supported along the middle-longitudinal-axis 12 by a disc 29 on the housing stop 20. On an end face facing the first housing end 19 of the outer housing 3 the guiding housing 27 comprises a recess into which a sealing element 30 is inserted. The sealing element 30 is used for guiding the piston rod 6 out of the damper 1 in a sealed manner. The recess in the guiding housing 27 is selected to be greater than the sealing element 30 arranged therein, so that by means of the guiding and sealing unit 5, the sealing element 30 and the piston rod 6 a pressure chamber 31 is delimited.

It is also possible to provide a valve ring 101 between the guiding housing 27 and the guiding cover 28. The valve ring 101 prevents the flow of fluid out of the working chamber 10 into the pressure chamber 31, in particular during a movement of the piston rod 6 in a retraction direction 41. With the movement of the piston rod 6 in insertion direction 42 a flow of fluid from the working chamber 10 into the pressure chamber 31 can be tolerated.

The guiding housing 27 comprises a shoulder 32, on which the inner housing 2 is supported in axial direction, i.e. along the middle-longitudinal-axis 12. In the region of the second housing ends 7, 22 the inner housing 2 is secured to the outer housing 3 by the housing cover 8 which is designed to be annular and bears with a housing cover stop projecting in radial direction over the inner housing 2 against the second housing end 7. To mount the bottom valve 9 the housing cover 8 has a housing cover bore arranged concentrically to the middle-longitudinal-axis 12, which passes into an annular housing cover recess. The bottom valve 9 enables a flow of fluid from the equalizing chamber 26 into the working chamber 10 and in particular into the second part-working chamber 16.

The piston rod 6 has a reduced diameter at its first piston rod end 14, whereby a piston rod stop 33 is formed. On the first piston rod end 14 from the piston rod stop 33 a first piston rod spacer disc 34, a first closing element 35 in the form of a disc spring, a piston disc 36, a second closing element 37 in the form of a disc spring, a second piston rod spacer disc 38 and a piston rod securing nut 39 are arranged. The piston rod securing nut 39 is screwed onto a piston rod thread and secures the piston 13 onto the piston rod 6. The piston 13 is formed by the first closing element 35, the piston disc 36, the second closing element 37 and a piston seal 40. The piston seal 40 is designed to be annular and arranged in a piston groove in the piston disc 36 provided for this purpose. The piston groove is formed in an outer wall of the piston disc 36 facing the inner housing 2. The piston seal 40 seals the piston disc 36 from the inner housing 2.

The first closing element 35 is effective upon the movement of the piston rod 6 in insertion direction 42 and is referred to in the following as a pressure disc spring. The second closing element 37 is effective in the retraction direction 41 and is referred to in the following as a traction disc spring. The traction disc spring 37 cooperates with a plurality of traction throughflow channels that are not shown and pressure disc spring 35 cooperates with a plurality of not shown pressure throughflow channels. The throughflow channels comprise respectively a transverse channel running transversely to the middle-longitudinal-axis 12 and a longitudinal channel connected to the transverse channel and running along the middle-longitudinal-axis 12. The throughflow channels are formed in the piston disc 36 and represent a connection between the first part-working chamber 15 and the second part-working chamber 16. The pressure throughflow channels can be formed—as viewed in the insertion direction 42—from the longitudinal channel and the transverse channel adjoining the latter. The traction throughflow channels can however be formed by the transverse channel and the adjoining longitudinal channel. The longitudinal channels of the traction throughflow channels can be arranged in the piston disc 36 such that they can be sealed by the elastically deformable traction disc spring 37. Accordingly the longitudinal channels of the pressure throughflow channels can be arranged in the piston disc 36 such that they can be sealed by the elastically deformable pressure disc spring 35. The throughflow channels can comprise in a movement of the piston 13 in retraction direction 41 or in insertion direction 42 respectively an effective flow cross-sectional area which can be changed by closing individual or several throughflow channels. The effective flow cross-sectional area is defined as a cross section for the throughflow channels that is effective for the damping force speed characteristic of the damper 1, wherein the cross section of the throughflow channels along the latter can be as desired. The effective flow cross-sectional area is thus defined as a resulting cross section of the throughflow channels.

The damper 1 has a preferred installation position such that the insertion direction 42 is identical to the direction of gravitational force. The damper 1 is installed onto an element to be damped such that the piston rod 6 is secured to the first securing element 18 on the moving part to be damped, for example the driver's seat. This means that the damper 1 is aligned to be substantially vertical with its middle-longitudinal-axis 12, wherein in this installation position the piston rod 6 with the first securing element 18 is arranged at the top.

The guiding and sealing unit 5 is arranged in the housings 2, 3 of the damper 1 in such a way that the guiding cover 28 faces the working chamber 10. The guiding cover 28 is arranged in a recess 43 of the guiding housing 27 provided for this purpose. The guiding cover 28 is arranged with an end face, projecting ring elevation 44 and groove of the guiding housing 27 provided therefor. In this way the guiding cover 28 and the guiding housing 27 are positioned relative to one another and in particular are arranged concentrically in relation to the middle-longitudinal-axis 12. An external groove is provided on an outer cylinder-casing surface 45 of the guiding cover 28, which extends along the middle-longitudinal-axis 12 as a helical line, i.e. in the form of helix. Accordingly the guiding cover 28 with the outer cylinder casing surface 45 lies only in sections on an inner cylinder casing surface 47 of the guiding housing 27. The outer groove 46 enables a fluid flow along a helical line on an outer periphery of the guiding cover 28 to a distributor channel 48. The distributor channel 48 is integrated substantially step-like into the guiding housing 27 and connects the outer groove 46 to the shoulder 32, wherein the distributor channel 48 extends up to an outer casing surface 49 of the outer housing section of the guiding housing 27. In this way it is ensured that the damping fluid 11 can flow from the working chamber 10 along the outer groove 46 via the distributor channel 48 into the equalizing chamber 26 arranged between the inner housing 2 and the outer housing 3. Since the distributor channel 48 is recessed in relation to the shoulder 32, on which the inner housing 2 is supported, the fluid flow is ensured. The outer groove 46 is defined as a throttling channel and according to the first exemplary embodiment has a semi-circular flow cross-sectional area with an internal width d and a length l. In the exemplary embodiment the internal width d is the diameter of the semi-circle. According to the exemplary embodiment shown in FIG. 3 and FIG. 4 the throttling channel 46 on the outer cylinder casing surface 45 of the guiding cover 28 is configured as a complete helical line, i.e. with an opening angle of 360°. This means that the pitch of the helical line corresponds with the width of the guiding cover 28. The helical line-shaped throttling channel 46 can also have a different opening angle than 360°. An opening angle of less than 360° and also of more than 360° is possible. The pitch of the helical line can differ from the width of the guiding cover 28. It is possible by changing the width of the guiding cover 28, i.e. by changing the dimension of the guiding cover 28 along the middle-longitudinal-axis 12 to also adjust the length of the throttling channel 46. The length l of the throttling channel 46 is greater than the internal width d of the throttling channel. It is also possible to have different cross-sectional shapes for the throttling channel 46, such as for example a circular shape or rectangular shape. The throttling channel 46 can also be configured to be meandering or with a different arrangement about the middle-longitudinal-axis 12. It is possible to provide in the throttling channel 46 at least one throttling check valve 100, in order to prevent the flow of fluid from the equalizing chamber 26 into the working chamber 10.

In the following the function of the damper 1 is described. The piston 13 comprises throughflow channels, which can be closed by disc springs 35, 37. In the position of rest of the damper the disc springs 35, 37 bear against the piston, i.e. the throughflow channels are closed. When activating the piston rod 6 the fluid pressure on the disc springs 35, 37 increases with increasing insertion and extraction speed, in particular until a shifting pressure is achieved in one of the part-working chambers 15, 16. Once this shifting pressure has been reached the corresponding disc spring 35, 37 lifts up from the piston. The flow of fluid between the two part-working chambers 15, 16 is possible unimpeded along the throughflow channels of the piston 13. Thus applies both when activating the piston 13 in the extraction direction 41 and also in the insertion direction 42. Such a damper 1 has a non-progressives damping behavior. The damping force-speed-characteristic is provided by the effective flow cross-sectional area of the throughflow channels.

It is also possible to design the damper 1 as a so-called progressive damper, the functioning of which is explained in the following. FIGS. 1 and 2 show the position of rest of the damper 1. The disc springs 35, 37 do not bear against the associated bearing surfaces and the throughflow channels are not closed. During a movement of the piston 13 in the extraction direction 41 or in the insertion direction 42 at low speed the piston 13, in particular the disc springs 35, 37 remain essentially in the position of rest shown in FIGS. 1, 2. The damping fluid 11 can flow through the throughflow channels during a movement of the piston 13. The disc springs 35, 37 leave an adequate gap between themselves and the associated bearing surfaces, so that the damping fluid 11 can enter into the other respective part-working chamber 15, 16. With the progressive damper the mode of action of the disc springs 35, 37 is changed relative to the non-progressive damper, i.e. disc spring 35 functions as a traction disc spring and disc spring 37 functions as a pressure disc spring. The damping force/speed characteristic is defined are at a lower speed by the effective flow cross-sectional area of the throughflow channels.

In the following with reference to FIG. 1 the function of the progressive damper 1 is described during a movement of the piston 13 in insertion direction 42, wherein the insertion speed is much higher compared to the movement of the piston 13 described above. During a movement of the piston 13 by means of the damping fluid 11 located in the second part-working chamber 16 force is exerted on the pressure disc spring 37. With increasing force the pressure disc spring 37 is deformed increasingly elastically and pressed against the associated bearing surfaces of the throughflow channels, whereby the effective flow cross-sectional area is reduced increasingly. At a sufficient level of force the pressure disc spring 37 bears completely against the bearing surfaces so that the throughflow channels are completely sealed. The damping fluid 11 can in this case flow simply through the throughflow channels from the second part-working chamber 16 into the first part-working chamber 15. In this way the traction disc spring 35 is pushed away from the associated bearing surfaces, so that the said fluid flow is made possible from the second part-working chamber 16 into the first part-working chamber 15.

The volume of the damping fluid 11 displaced by the piston rod 6 flows via the throttling channel 46 and the distributor channel 48 into the equalizing chamber 26. Owing to the fact that the flow cross section of the throttling channel 46 is reduced relative to the annular cross section in the first part-working chamber 15, the damping fluid 11 is throttled along the throttling channel 46. The throttling channel 46 is thus essentially independent of the manufacturing tolerances of the piston rod 6 and a guiding bore 50, through which the piston rod 6 is guided in the guiding and sealing unit 5. Furthermore deviations in the dimensions during the production of the throttling channel 46 are not significant to the damping effect of the damper 1, as the damping function is dependent on the volume flow of the damping fluid 11 flowing through the throttling channel 46. The said damping effect is influenced essentially by the length l of the throttling channel 46, which is greater than the internal width d of the throttling channel 46. In particular, the guiding and damping unit 5 ensures that a throughflow of the annular gap between the piston rod 6 and guiding bore 50 does not impair the damping effect of the damper 1.

A change in the throttling effect and thereby the damping effect of the damper 1 can be achieved directly and in an uncomplicated manner by a change in the length l of the throttling channel 46, in that for example the width of the guiding cover 28 is changed, i.e. its extension along the middle-longitudinal-axis 12.

It is also possible to tolerate throughflow through the annular gap. In this case a small portion of the damping fluid 11 flows into the pressure chamber 31. In addition, a not shown valve ring can be provided in order to prevent the damping fluid 11 flowing unthrottled into the pressure chamber 31 and acting there with fluid pressure $p_f$ on the sealing element 30. In this way the lifetime of the sealing element 30 can be increased. In the pressure chamber 31 in addition a not shown venting opening can be provided, which at minimum venting pressure $p_e$ enables the venting of the pressure chamber. The venting pressure $p_e$ is greater than the fluid pressure $p_f$.

When activating the piston rod 6 on the basis of the arrangement in FIG. 2 along the extraction direction 41 the damping fluid 11 is displaced out of the first part-working chamber 15 through the piston 13 and flows at the first housing end 4 via the throttling channel 46 and the distributor channel 48 into the equalizing chamber 26. This means that also upon the activation of the damper 1 in the extraction direction 41 the damping fluid 11 passes through the throttling channel 46. At the second housing end 7 the damping fluid 11 is suctioned via the bottom valve 9 of the inner housing 2 into the second part-working chamber 16. In addition it is possible that through the through openings in the piston disc 36 there is a direct flow of fluid from the first part-working chamber 15 into the second part-working chamber 16.

In the following with reference to FIGS. 5 and 6 a second exemplary embodiment of the invention is described. Identical parts are given the same reference numerals as in the first exemplary embodiment and reference is made to the description of the latter here. Structurally different, but functionally similar parts are given the same reference numerals but with the addition of an a. The main difference from the first exemplary embodiment is that the throttling channel 46a is configured as an inner groove on the inner cylinder casing surface 47a of the guiding housing 27a. However, the outer cylinder casing surface 45a of the guiding cover 28a is designed without a groove. In the shown exemplary embodiment the length l of the throttling channel 46a can be influenced directly by varying the width of the guiding cover 28a, i.e. its extension along the middle-longitudinal-axis 12.

Figure 8:
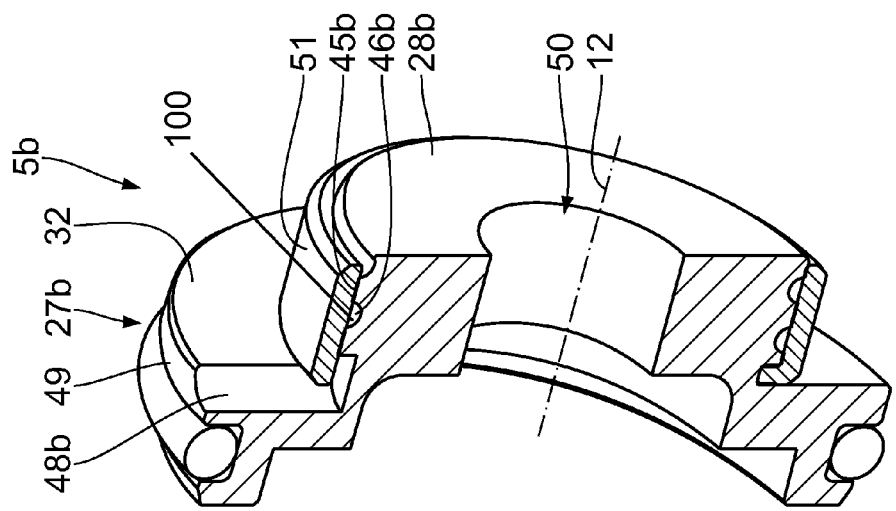
FIG. 8 shows a cross-sectional, perspective view according to FIG. 4 of a guiding and sealing unit according to the third exemplary embodiment.
Figure 7:
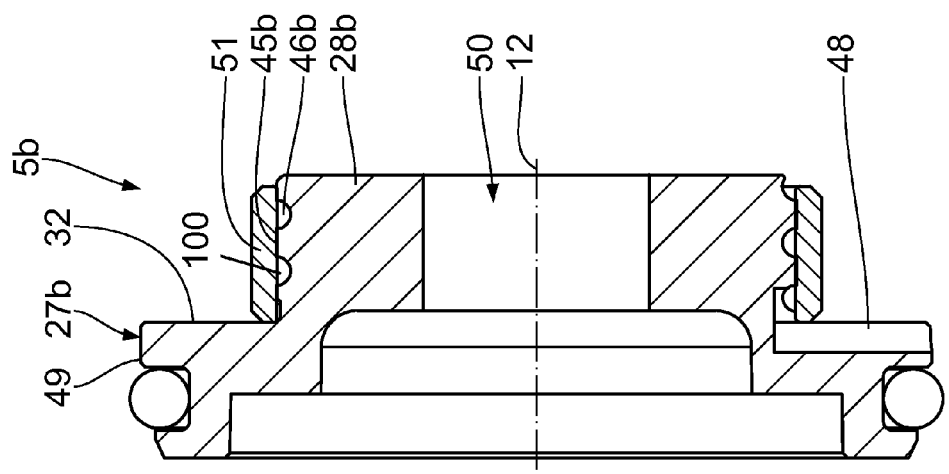
FIG. 7 shows a view according to FIG. 3 of a guiding and sealing unit according to a third exemplary embodiment.

In the following with reference to FIGS. 7 and 8 a third exemplary embodiment of the invention is described. Identical parts are given the same reference numerals as in the two first exemplary embodiments, and reference is made to the description of the latter here. Structurally different, but functionally similar parts have been given the same reference numerals but with an additional b. The main difference from the two first exemplary embodiments is that the throttling channel 46b is integrated as an outer groove on an outer cylinder casing surface 45b of the guiding housing 27b. Accordingly, the inner housing section of the guiding housing 27b does not have a recess for a guiding cover. The guiding cover 28b is thus integrated in one piece into the guiding housing 27b. The throttling channel 46b is covered by a cover element 51, which is arranged between the outer cylinder casing surface 45b of the guiding housing 27b and an inner casing surface of the inner housing 2. By varying a width of the cover element 51 the effective length of the throttling channel 46 and thereby the damping effect of the damper 1 can be changed. It is possible to provide the guiding cover 28b as a separate component and arrange it on the guiding housing 27b. Alternatively, it would also be possible for the throttling channel 46b to be provided as an inner groove on an inner cylinder casing surface of the cover element 51. In this case the outer cylinder casing surface 45b of the guiding housings 27b would be configured without an outer groove, i.e. to be planar.

In the following with reference to FIGS. 9 and 10 a fourth exemplary embodiment of the invention is described. Identical parts are given the same reference numerals as in the first three exemplary embodiments, the description of which is referred to here. Structurally different, but functionally similar parts are denoted by the same reference numerals but with an additional c. The main difference from the first exemplary embodiments is that the throttling channel 46c is configured to be helical on an end face 52 of the guiding cover 28c facing the guiding housing 27c. Accordingly, the guiding cover 28c comprises an access opening 53, through which the damping fluid 11 can pass from the working chamber 10 into the throttling channel 46c. The access opening 53 connects the two opposite end faces 52 of the guiding cover 28c. Accordingly the guiding cover 28c has an outlet opening 54 aligned radially outwards relative to the middle-longitudinal-axis 12, which connects the throttling channel 46c to the distributor channel 48 in the guiding housing 27c. The cylinder-casing surfaces 45c, 47c of the guiding housing 27c or the guiding cover 28c do not have any grooves.

Furthermore, on the end face 52 of the guiding cover 28c, which faces the guiding housing 27c, a positioning pin 55 is provided. The positioning pin 55 can be arranged in a recess provided therefor in the guiding housing 27c. In this way the guiding cover 28c is secured relative to a rotational position about the middle-longitudinal-axis 12 on the guiding housing 27c. Accordingly, the length l of the spiral-shaped throttling channel 46c is determined. Thus it is possible to adjust the damping effect by changing the length l of the throttling channel 46c.

The spiral-shaped throttling channel 46c can also be arranged on the end face of the guiding body 27c. Accordingly the guiding cover 28c has a plane end face.

What is claimed is:

1. A damper for damping a movement along a middle-longitudinal-axis, comprising:
   an outer housing extending along the middle-longitudinal-axis;
   a guiding and sealing unit closing the outer housing at a first housing end;
   a piston rod guided out of the first housing end sealed by the guiding and sealing unit;
   an inner housing arranged in the outer housing, which surrounds a working chamber;
   a damping fluid located in the working chamber;
   a second housing end opposite the first housing end;
   a piston guided in the inner housing along the middle-longitudinal-axis and secured to the piston rod, wherein the piston divides the working chamber into a first part-working chamber facing the first housing end and a second part-working chamber facing the second housing end, and wherein the piston comprises at least one throughflow channel for connecting the part-working chambers;
   an equalizing chamber arranged between the inner housing and the outer housing; and
   a throttling channel integrated into the guiding and sealing unit for a fluid throttling connection between the working chamber and the equalizing chamber, wherein the throttling channel has a length and a cross-sectional area comprising an internal width, said throttling channel being configured to be at least one of helical, meandering and spiral-shaped about the middle-longitudinal-axis.

2. A damper according to claim 1, wherein the damper is provided for damping a seat in a vehicle.

3. A damper according to claim 1, wherein the throttling channel is oriented at least in sections at right angles to the middle-longitudinal-axis.

4. A damper according to claim 1, wherein said internal width is less than said length.

5. A damper according to claim 1, wherein a ratio of said internal width and said length is less than 0.1.

6. A damper according to claim 1, wherein a ratio of said internal width and said length is less than 0.05.

7. A damper according to claim 1, wherein a ratio of said internal width and said length is less than 0.01.

8. A damper according to claim 1, wherein a ratio of said internal width and said length is less than 0.005.

9. A damper for damping a movement along a middle-longitudinal-axis, comprising:
   an outer housing extending along the middle-longitudinal-axis;
   a guiding and sealing unit closing the outer housing at a first housing end;
   a piston rod guided out of the first housing end sealed by the guiding and sealing unit;
   an inner housing arranged in the outer housing, which surrounds a working chamber;
   a damping fluid located in the working chamber;
   a second housing end opposite the first housing end;
   a piston guided in the inner housing along the middle-longitudinal-axis and secured to the piston rod, wherein the piston divides the working chamber into a first part-working chamber facing the first housing end and a second part-working chamber facing the second housing end, and wherein the piston comprises at least one throughflow channel for connecting the part-working chambers;
   an equalizing chamber arranged between the inner housing and the outer housing; and
   a throttling channel integrated into the guiding and sealing unit for a fluid throttling connection between the working chamber and the equalizing chamber, said throttling channel having a length and a cross-sectional area comprising an internal width, wherein the length of the throttling channel is adjustable variably.

10. A damper according to claim 1, wherein the guiding and sealing unit comprises a guiding housing and a guiding cover.

11. A damper according to claim 10, wherein the throttling channel is integrated into at least one of the guiding housing and the guiding cover.

12. A damper, comprising:
   an outer housing extending along a middle-longitudinal-axis;
   a guiding and sealing unit closing the outer housing at a first housing end;
   a piston rod guided out of the first housing end sealed by the guiding and sealing unit;
   an inner housing arranged in the outer housing, which surrounds a working chamber;
   a damping fluid located in the working chamber;
   a second housing end opposite the first housing end;
   a piston guided in the inner housing along the middle-longitudinal-axis and secured to the piston rod, wherein the piston divides the working chamber into a first part-working chamber facing the first housing end and a second part-working chamber facing the second housing end, and wherein the piston comprises at least one throughflow channel for connecting the part-working chambers;
   an equalizing chamber arranged between the inner housing and the outer housing; and
   a throttling channel integrated into the guiding and sealing unit for a fluid throttling connection between the working chamber and the equalizing chamber, said throttling channel having a length and a cross-sectional area comprising an internal width, said guiding and sealing unit comprising a guiding housing and a guiding cover, wherein the throttling channel is configured as a groove on a cylinder casing surface of the guiding housing.

13. A damper according to claim 10, wherein the throttling channel is configured as a groove on at least one of an outer cylinder-casing surface and an end face surface of the guiding cover.

14. A damper according to claim 10, wherein the end surface of the guiding cover faces the guiding housing.

15. A damper according to claim 10, wherein the guiding and sealing unit comprises a cover element.

16. A damper according to claim 15, wherein the annular cover element is arranged between an outer casing surface of the guiding housing and an inner casing surface of the inner housing.

17. A damper according to claim 1, wherein at least one check valve in the throttling channel is arranged such that the flow of fluid is allowed along the throttling channel from the working chamber into the equalizing chamber.

18. A damper according to claim 1, wherein at least one check valve in the throttling channel is arranged such that the flow of fluid is prevented from the equalizing chamber into the working chamber.

19. A damper according to claim 1, wherein the guiding and sealing unit comprises a sealing element and a valve ring.

20. A damper according to claim 19, wherein the guiding and sealing unit comprises a venting opening for venting a pressure chamber delimited by the guiding and sealing unit, the sealing element, the valve ring and the piston rod.

21. A damper according to claim 20, comprising a minimum venting pressure for venting the pressure chamber via the venting opening, wherein the venting pressure is greater than a fluid pressure along the throttling channel.

22. A damper according to claim 1, wherein the working chamber is connected at the second housing end by means of a bottom valve to the equalizing chamber.

23. A damper according to claim 22, wherein the bottom valve enables a flow of fluid from the equalizing chamber into the working chamber.

24. A damper according to claim 22, wherein the bottom valve enables a flow of fluid from the equalizing chamber into the second part-working chamber.

\* \* \* \* \*